(No Model.) 4 Sheets—Sheet 1.
T. McFADDEN & D. ROSSER.
PIPE THREAD CUTTING MACHINE.
No. 407,413. Patented July 23, 1889.
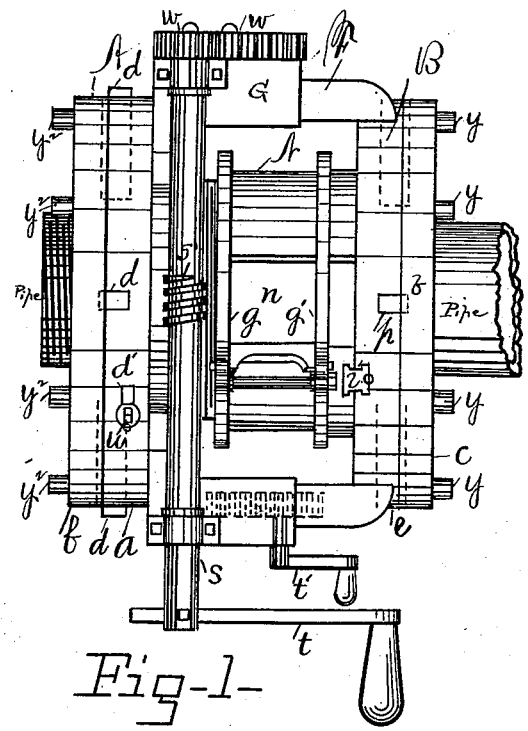
Fig-1-
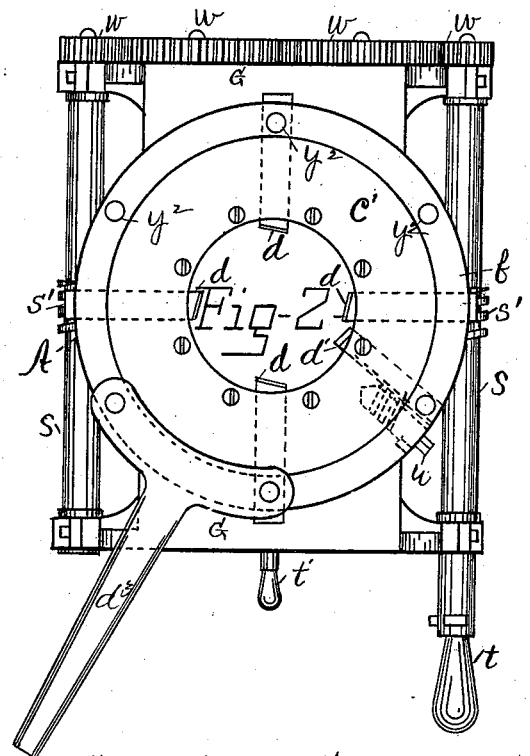
Fig-2-
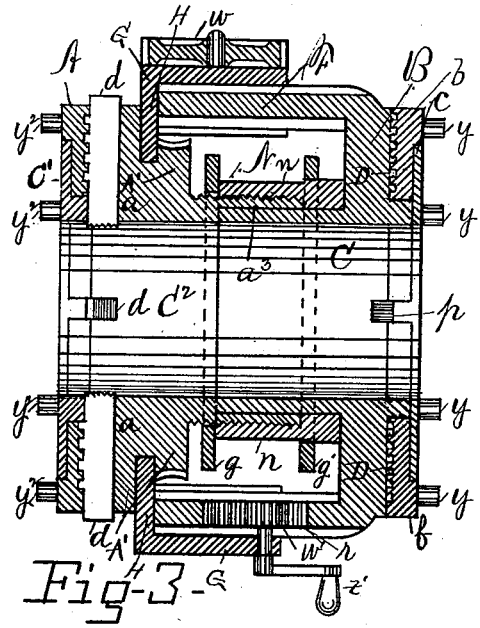
Fig-3-
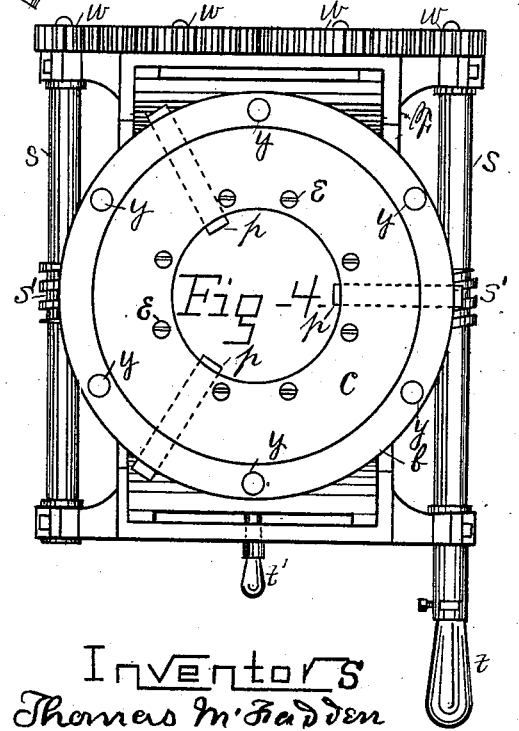
Fig-4-
Witnesses
C. C. Woodworth
Jno. E. Rose,
Inventors
Thomas McFadden
David Rosser
By C. D. Woodworth
Their Atty (No Model.) 4 Sheets—Sheet 2.
T. McFADDEN & D. ROSSER.
PIPE THREAD CUTTING MACHINE.
No. 407,413. Patented July 23, 1889.
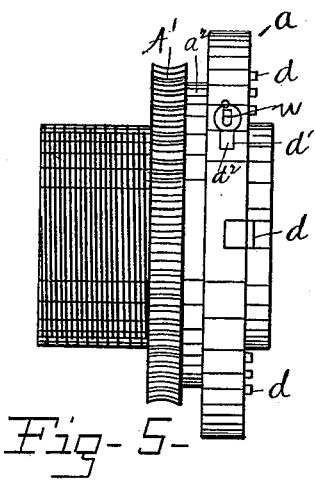
Fig-5-
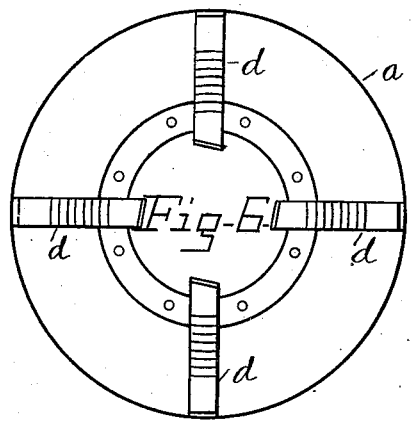
Fig-6-
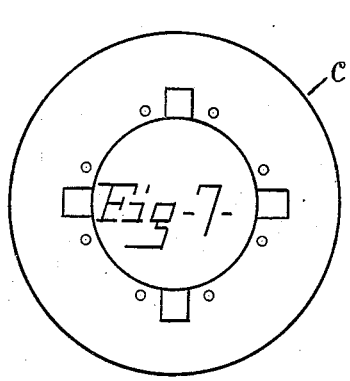
Fig-7-
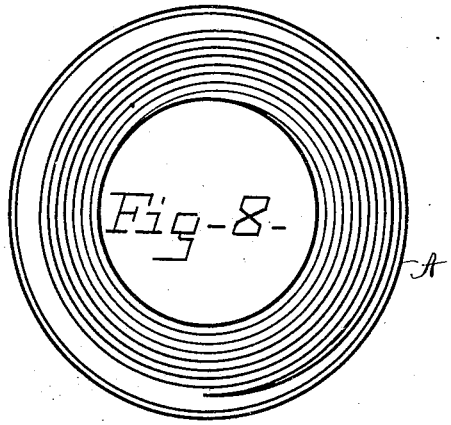
Fig-8-
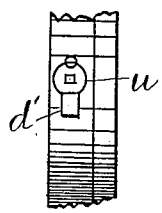
Fig-9-
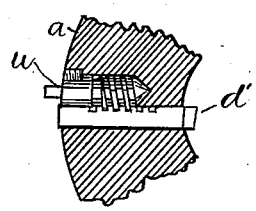
Fig-10-
Witnesses
C. C. Woodworth
Geo. E. Rose
Inventors
Thomas McFadden
David Rosser
By L. D. Woodworth
Their Atty

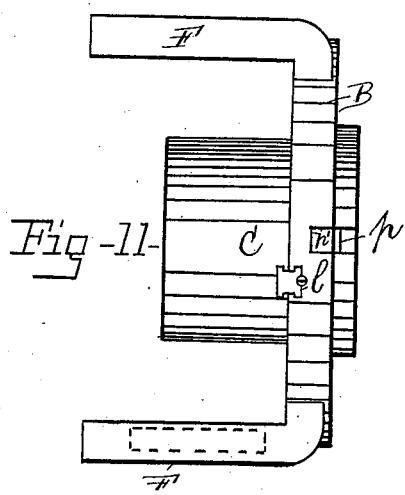
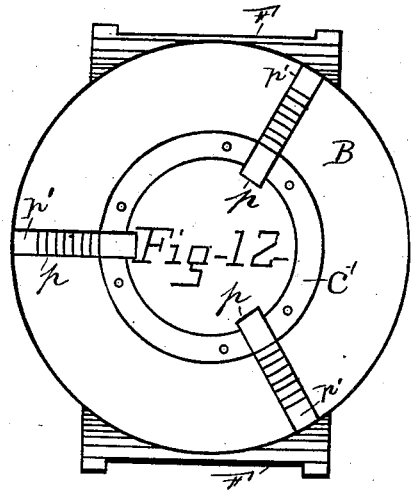
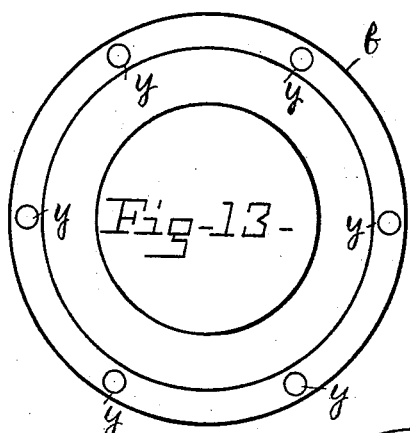
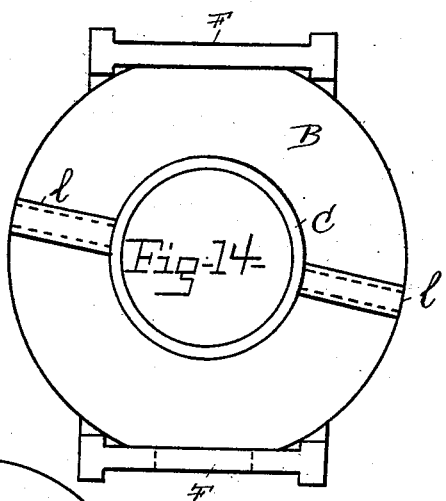
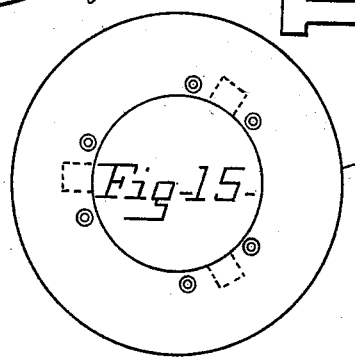

(No Model.) 4 Sheets—Sheet 4.
T. McFADDEN & D. ROSSER.
PIPE THREAD CUTTING MACHINE.
No. 407,413. Patented July 23, 1889.
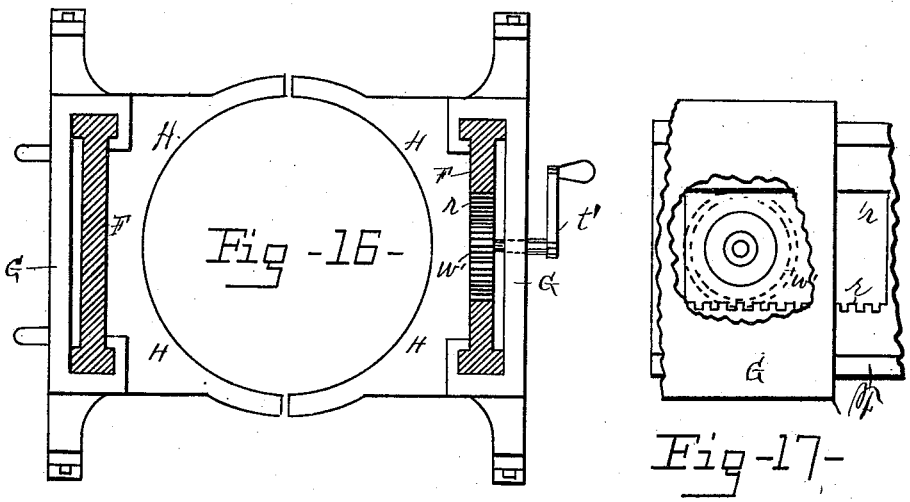
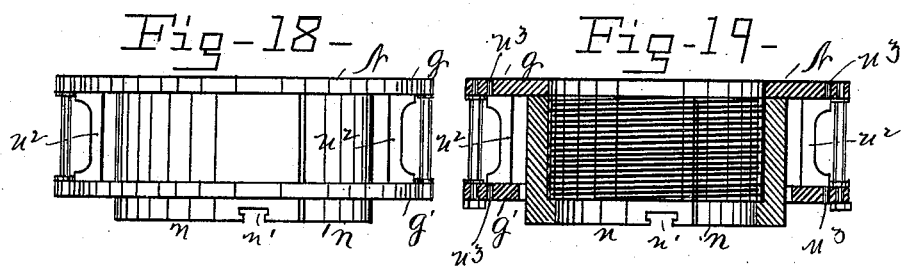
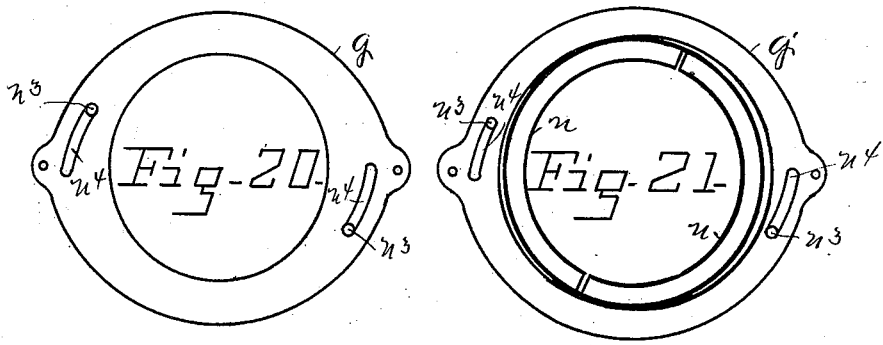
Witnesses
C. H. Woodworth
Geo. E. Rose
Inventors
Thomas McFadden
David Rosser
By F. D. Woodworth
Their Atty

UNITED STATES PATENT OFFICE.

THOMAS McFADDEN AND DAVID ROSSER, OF YOUNGSTOWN, OHIO.

PIPE-THREAD-CUTTING MACHINE.

SPECIFICATION forming part of Letters Patent No. 407,413, dated July 23, 1889.

Application filed June 23, 1888. Serial No. 277,946. (No model.)

*To all whom it may concern:*

Be it known that we, THOMAS McFADDEN and DAVID ROSSER, citizens of the United States, residing at Youngstown, in the county of Mahoning and State of Ohio, have invented certain new and useful Improvements in Pipe-Thread-Cutting Machines; and we do hereby declare the following to be a full, clear, and exact description of our invention, such as will enable others skilled in the art to which it appertains to make and use the same, reference being had to the accompanying drawings, which form part of this specification.

Our invention relates to machines for separating in twain and for cutting threads upon natural-gas pipes and other similar pipes of metal that are connected by thread joints; and its object is to produce a conveniently-portable machine for cutting a pipe in two and for cutting threads thereon in or beside the ditch in which said pipe is laid, so that in case in the work of pipe-laying an unprovided length of pipe is required, and in cases of damaged threads, and generally in repair of pipe-lines, all work may be done upon the spot without the necessity that now exists of sending to the shop, whereby a very great saving of labor and expense may be effected. We have realized this object by the machine hereinafter described, and illustrated in the drawings, in which—

Figure 1 is a top view of our machine holding a section of pipe therein in the process of thread-cutting. Fig. 2 is a forward end view of the machine. Fig. 3 is a longitudinal vertical sectional view of the same. Fig. 4 is a rear end view of the same. Fig. 5 is a side view of the die-stock. Fig. 6 is a face view of the same. Fig. 7 is an inward face view of the washer on the face of the die-stock. Fig. 8 is a face view of the scroll for feeding the dies to the work. Fig. 9 is an edge view of a section from the periphery of the die-stock. Fig. 10 is a side vertical section view of the same, exhibiting the mechanism by which the die for cutting a pipe in twain is advanced to and withdrawn from contact with the pipe. Fig. 11 is a vertical longitudinal view of the vise-stock *e*. Fig. 12 is a rear face view of the same. Fig. 13 is a view of the side of the scroll opposite the face shown at Fig. 8 and denominated the back. Fig. 14 is a view of the forward face of the vise-stock. Fig. 15 is an outward face view of the washer. Fig. 16 is a top view of the frame, showing cross-sections of the arms of the vise-stock therein. Fig. 17 is a side view of a central section of the machine broken through an upright of the frame to exhibit the rack and cogged wheel that moves it. Fig. 18 is a side view of the open nut. Fig. 19 is a vertical cross-sectional view of the same. Fig. 20 is a face view of the upper guide of the nut, and Fig. 21 is a similar view of the lower guide of the same.

Similar letters refer to similar parts in all views.

The machine consists, generally, of a clamp for holding against rotation the pipe to be operated upon, a cutter or die for cutting or threading the pipe, means for operating the cutting mechanism, and means for feeding the die-stock as the thread is cut, all of which devices are combined in a portable and compact machine.

We provide a disk B with a central cylindrical sleeve or hub C, extending beyond the same to both sides. The disk B has on one face a spiral thread or scroll-plate *b*, the threads being shown at D. This scroll or plate is provided near the periphery with a series of pins *y* for the reception of a tool or wrench for turning the said plate, and also has an annular recess (see Fig. 13) for the reception of a washer *c*. (Shown in detail in Fig. 15.) The washer may be held to the disk B by screws E, so that while the scroll is held firmly to the said disk it may be turned freely thereon.

The disk B is provided with radial grooves *p'* (shown in Figs. 11 and 12 especially) for the reception of jaws *p*, which have threads across the face contiguous with the scroll-plate *b*, and have their inner ends formed into heads with serrations on that portion which will engage the pipe.

The hub C and washer *c* are recessed, so that the jaws may be retracted until flush with the inner surface of the said hub.

This mechanism above described is what we call the "vise," and its purpose is to hold the pipe to be operated upon firmly against rotation, and the jaws being adjustable any sized pipe up to the internal diameter of the hub C may be held by the said vise.

The operation of the vise-stock is obvious, the jaws being moved radially by the rotation of the scroll, as is common in lathe-chucks of certain constructions.

Cast on or secured to the disk B are diametrically-opposed arms F, reduced centrally to form a web. These arms project in a direction opposite the face of the disk and are parallel to the hub C. Grasping the arms F, and riding freely thereon, are carriages G, joined together by shafts S, each provided with a worm S', suitably journaled in the said carriages, so as to make them move and operate practically as one carriage. The end of one of the shafts is continued beyond the respective carriage and carries a handle $t$, by means of which the shafts are rotated, motion being communicated from one to the other by a train of gear $w$ $w$.

The die-stock consists of a disk $a$, similar to the disk B, a scroll A, similar to the scroll $b$, a washer $c'$, similar to the washer $c$, threaded dies $d$, similar to the jaws $p$, except that the heads contain screw-sections on the faces that operate on the pipe to cut a suitable thread, and pins $y^2$, similar to the pins $y$. The operating-handle is shown at $d^3$, Fig. 2, in proper position to move the scroll. Beside the dies $d$, for threading the pipe, the disk $a$ also carries a cut-off jaw $d'$ behind the said dies, and operated by a screw $u$, which moves the said jaw in or out, as will be clearly seen from Fig. 10. The disk $a$ is provided with a hub $C^2$, similar to the hub C, except that the outer surface is threaded and the inner surface has an annular enlargement $a^3$, Fig. 3, for the reception of the hub C, as shown in the said figure. The disk $a$ has cast on it, or secured to it, a worm gear-wheel A', leaving a groove $a^2$ between its periphery and the said disk. This gear-wheel is engaged by the worms S' on the shafts S, and the entire die-stock thereby rotated. Each carriage G has a flange H formed on it, of such shape as to engage in the groove $a^2$ and hold the vise-stock and die-stock adjustably together, but in no wise interfering with the free rotation of the said die-stock. Surrounding the hub C, and also the threaded portion of the hub $C^2$, extending over the hub C, is an internally-threaded nut or sleeve N, which, being formed of two pieces $n$ $n$, we term a "split nut." The pieces $n$ $n$ have each a dovetail or undercut slot $n'$, in each of which fits a key $l$, similarly dovetailed in the disk B, the arrangement being shown in Fig. 14. Each piece $n$ has a projecting piece or stud $n^2$, carrying pins $n^3$, which fit in eccentric slots $n^4$ in two frames $g$ and $g'$, secured together, as seen in Figs. 18 and 19. These frames have central openings, one or both being elliptical, the arrangement being such that the turning of the frames will carry the two pieces $n$ $n$ away from or toward each other. Thus by moving the frame so that the said pieces are caused to approach the nut will grasp the threaded hub $C^2$, and being fixed to the disk B the die-stock will be moved to or from the said vise-stock as the die-stock is rotated. This feed is necessary when a pipe is being threaded, but is thrown out of operation when the cut-off jaw is in operation.

In order to move the carriage G G quickly to or from the vise, we provide one of the arms F with a toothed slot $r$, and provide the carriage with a short shaft carrying a handle $t'$ and a cog-pinion $w'$, which latter engages the rack-teeth in the slot $r$.

The operation of the machine is clearly apparent from the foregoing description. To thread a pipe, it is passed through the hubs C $C^2$ until the end is against or near the dies. It is then clamped firmly by the vise, and the nut N being in operation the dies are caused to act on the pipe and the die-stock is fed toward the vise by the rotation of the said die-stock. When it is desired to cut a pipe, it is clamped as before, but with the screw-dies retracted and the cutter-die advanced, the feed-nut being out of operation. To apply power, the handle $t'$ may be replaced by any suitable device.

As it is evident that many modifications within the scope of our invention would be readily suggested to a skilled mechanic, we do not limit ourselves to the exact construction and arrangement of parts shown and described.

If desired, the die-stock may have an index or dial to indicate the projection of the dies.

Having described the invention, what we claim is—

1. The combination, with a vise for holding pipe and the like, of a rotative die-stock and a feed for the latter, consisting of a screw-threaded hub on the die-stock and a nut secured to the vise and movable into and out of engagement with the said hub, substantially as described.

2. The combination, with a vise for holding pipe and the like, of a rotative die-stock and a feed for said stock, consisting of a split nut and an eccentric for operating the nut, the said nut being connected to the vise and die-stock, substantially as and for the purpose specified.

3. The combination, with a vise for holding pipe and the like, of a rotative die-stock, a carriage connecting the vise and die-stock, and gear carried by the carriage and connected to the said die-stock to rotate it, substantially as described.

4. The combination, with a vise for holding pipe and the like, of a rotative die-stock, a carriage connecting the vise and stock, operating-gear for the die-stock, a split nut, and the means, substantially as described, for operating said nut to produce a slow feed for the said stock, and a rack and pinion between the vise and carriage to produce a quick feed for the stock, substantially as described.

5. In a thread-cutting machine, a stock consisting of a disk with radial grooves, dies or similar devices in said grooves, and provided with surface threads, a plate or scroll with spiral threads on one face and projecting pins near the periphery, and a washer for holding the scroll to the disk, substantially as described.

6. In combination with the die-stock of a thread-cutting machine, a feed for the said stock, consisting of an internally-threaded split nut engaging said stock, and frames with eccentric grooves engaging pins on said nut, one of the frames having an elliptical opening and embracing the nut, substantially as described.

7. A pipe threading and cutting machine consisting of a vise-stock composed of the disk B, with arms F and hub C, the jaws $p$, the scroll-plate $b$, and means, as the washer $c$, for retaining the plate on the disk, a die-stock composed of the disk $a$, having the gear A′ and threaded hub C², dies, substantially as described, the scroll-plate A, and retaining means, as the washer $c'$, for the said plate A, the feed-nut composed of two parts $n\ n$ and frames $g$, the carriage G, composed of two parts united by the shafts S, the worms on the shafts to engage the gear A′, and the rack-and-pinion feed $r\ w'$, all combined to operate substantially as described.

In testimony whereof we hereunto affix our signatures in the presence of two witnesses.

THOMAS McFADDEN.
DAVID ROSSER.

Witnesses:
HORACE SMITH,
JOHN R. DAVIS.